(12) United States Patent
Peeters et al.

(10) Patent No.: US 10,016,948 B2
(45) Date of Patent: Jul. 10, 2018

(54) METHOD FOR PRODUCING SANDWICH PANEL

(71) Applicant: FiberCore IP B.V., Rotterdam (NL)

(72) Inventors: Johannes Hendricus Alphonsus Peeters, Rotterdam (NL); Cornelis Henricus Honselaar, Zoeterwoude (NL)

(73) Assignee: FiberCore IP B.V., Rotterdam (NL)

( * ) Notice: Subject to any disclaimer, the term of this patent is extended or adjusted under 35 U.S.C. 154(b) by 349 days.

(21) Appl. No.: 14/688,543

(22) Filed: Apr. 16, 2015

(65) Prior Publication Data

US 2015/0217521 A1 Aug. 6, 2015

Related U.S. Application Data

(62) Division of application No. 13/054,637, filed as application No. PCT/NL2009/050445 on Jul. 17, 2009, now abandoned.

(30) Foreign Application Priority Data

Jul. 18, 2008 (NL) .................................. 2001830

(51) Int. Cl.
  *B29C 70/36* (2006.01)
  *B29C 70/42* (2006.01)
  (Continued)

(52) U.S. Cl.
  CPC ............ *B29C 70/42* (2013.01); *B29C 70/865* (2013.01); *B29D 24/008* (2013.01);
  (Continued)

(58) Field of Classification Search
  CPC .................................................. B29C 70/443
  See application file for complete search history.

(56) References Cited

U.S. PATENT DOCUMENTS

| 2,833,682 A | 5/1958 | De Laszlo |
| 2,873,008 A | 2/1959 | Ashman |

(Continued)

FOREIGN PATENT DOCUMENTS

| WO | 0220256 | 3/2002 |
| WO | 2007129886 | 11/2007 |
| WO | 9009880 | 9/2011 |

OTHER PUBLICATIONS

International Search Report dated Mar. 5, 2010, in PCT application.

*Primary Examiner* — Galen H Hauth
(74) *Attorney, Agent, or Firm* — NLO N.V.; Catherine A. Shultz; Lindsey A. Auerbach

(57) ABSTRACT

A method for producing a panel includes steps of providing a core element, covering the core element with a strip of impregnable flexible material that continues beyond the core element, providing a following core element alongside the preceding covered core element on that portion of the strip of flexible material that extends beyond the preceding core element, covering the following core element with a following strip of flexible material that extends beyond the following core element, and repeating each of those steps at least once. The method further includes impregnating the strips of material with a hardenable fluid, and hardening the impregnated strips. Each following strip of flexible material is fitted over the top face of a following core element, as well as over the preceding strip of flexible material extending over the top face of a preceding core element.

18 Claims, 5 Drawing Sheets

(51) Int. Cl.
*B29C 70/86* (2006.01)
*B29D 24/00* (2006.01)
*B29D 99/00* (2010.01)
*B32B 37/10* (2006.01)
*B32B 37/18* (2006.01)
*B32B 38/08* (2006.01)
*B29L 31/00* (2006.01)

(52) U.S. Cl.
CPC ...... *B29D 99/0021* (2013.01); *B32B 37/1018* (2013.01); *B32B 37/18* (2013.01); *B32B 38/08* (2013.01); *B29L 2031/772* (2013.01); *B32B 2305/22* (2013.01); *B32B 2307/546* (2013.01); *Y10T 156/10* (2015.01); *Y10T 428/24669* (2015.01)

(56) References Cited

U.S. PATENT DOCUMENTS

| | | | |
|---|---|---|---|
| 3,185,611 A | | 5/1965 | Rodman et al. |
| 3,795,559 A | * | 3/1974 | Horn et al. ........... B29C 33/505 |
| | | | 156/152 |
| 4,411,939 A | | 10/1983 | Hawkins et al. |
| 5,904,972 A | * | 5/1999 | Tunis, III .............. B29C 43/021 |
| | | | 428/118 |

* cited by examiner

*Fig 3*
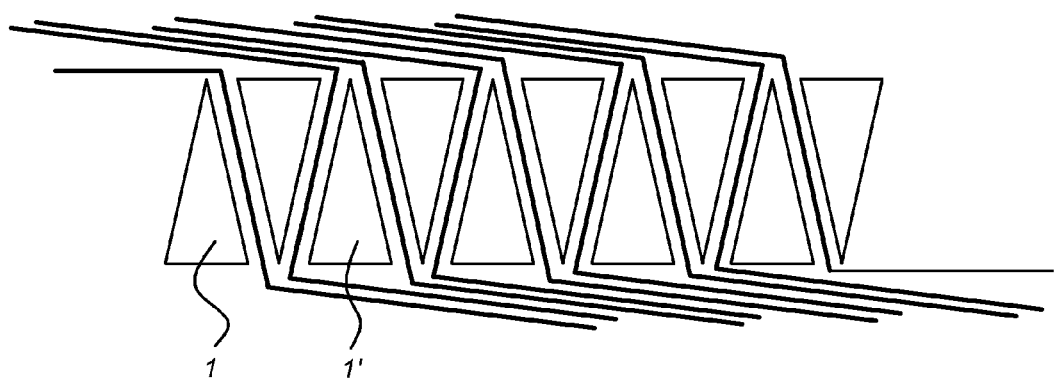
*Fig 4*  *Fig 5*
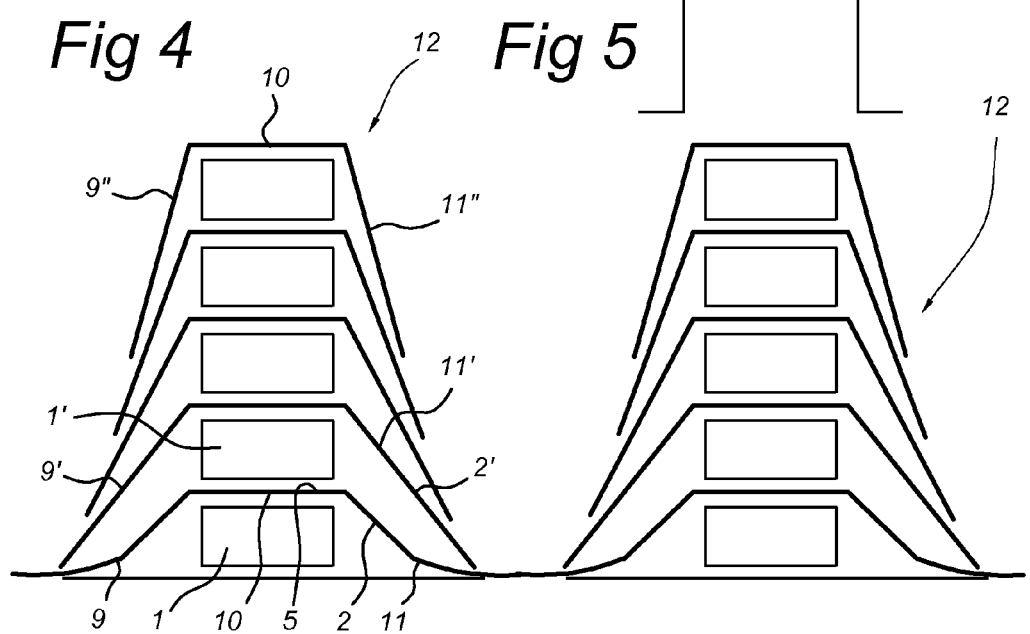

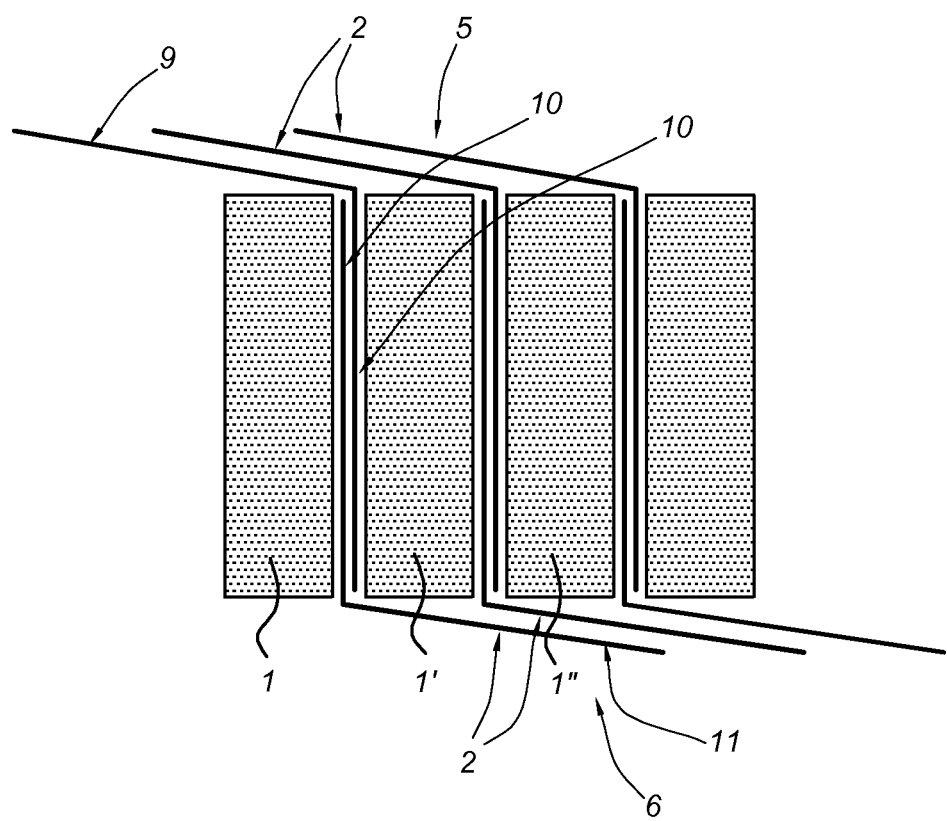

METHOD FOR PRODUCING SANDWICH PANEL

The invention relates to sandwich panels of fiber-reinforced plastics materials, which are particularly suitable for relatively high loads. By way of example, sandwich panels are cited which can be used for the deck of a bridge or as a self-supporting bridge construction. In such applications, the panel must be able to withstand the heavy loads of road traffic. These loads take different forms. It is firstly a matter of the total weight of traffic present on a bridge, which manifests itself in bending and torsion of the panel between the supports thereof. In addition, account must be taken of local loads, such as caused by the wheel load of heavy freight traffic, to which the surface of the sandwich panel, in particular, is exposed.

Such local loads will lead to deformation of the bridge deck. If freight falls from a truck, for example, then the local load can give rise to permanent damage to the surface of the sandwich panel. In this connection, falling-off freight such as concrete parts, rail tracks and the like can be thought of. Although a bridge deck made up of steel panels on steel girders undergoes a permanent deformation, manifested in indentations or perforations, as a result of the high local load which is hereupon generated, the total integrity of the construction in question is not thereby affected. Hence, the load-bearing capacity of the bridge itself is not endangered.

For various reasons, the production of bridge decks from materials other than steel or concrete is sought. One example of such an alternative is provided by the bridge decks produced from fiber-reinforced plastics laminates. Such a bridge deck can be produced with suitable templates in a variety of different forms. By virtue of the strong fibers which are available, the total resistance of such a bridge deck with regard to general bending and torsion is excellent, such that panels produced in this way could withstand the heaviest loads of heavy freight traffic. A drawback of fiber-reinforced plastic laminates is however their relatively low resistance to local loads or point loads, that is to say a static load or an impact load. It is precisely such loads which can cause damage in the panel, resulting in a delamination or detachment of the outer skin from the sandwich panel which gets progressively worse under the influence of the passing traffic.

A panel having mutually averted panel surfaces and a periphery which delimits the panel surfaces, comprising a series of parallelly positioned, elongated core elements, as well as material strips which are affixed to the core elements and which each extend between respectively two neighboring core elements and along both panel surfaces, is known from WO-A-9009880. The sole object which is aimed for with this known construction is the enlargement of the contact surface between the web plates and the skin.

The object of the invention is to provide a sandwich panel which is made up of fiber-reinforced plastic components and which nevertheless meets the requirements with regard to point and impact loads. This object is achieved by virtue of the fact that those portions of the material strips which extend along the panel surfaces extend over a plurality of core elements. By a series of parallelly positioned core elements is meant a multiplicity of core elements which are located side by side and/or one upon the other, such that the product thus formed has a width and/or height amounting to a multiple of the width and/or height of a core element.

During the construction, the cores and the material strips can be loosely stacked. A glue, or a mechanical joint, can here possibly be used to obtain a temporary connection. In the finished construction, the material strips are affixed to the core elements, that is to say following injection and setting of the resin.

The panel according to the invention consists of a large number of core elements extending parallelly alongside one another, which are mutually connected by the material strips which extend over, under and between the core elements. In this context, it is important that the panel surfaces (the skins) and surfaces extending between respectively two neighboring core elements (the web plates) of the sandwich panel are made up of the same material strips. In conventional sandwich panels, a distinction can always at least partially be drawn between material strips used for the web plates, on the one hand, and material strips used for the skins, on the other hand. Firstly, such a construction according to the invention ensures a particularly robust mutual connection of the core elements and skins. Secondly, the skins thus formed and the ribs formed between the core elements are integrally connected to one another. For the ribs merge directly into the skins, which skins consist of those parts of the material strips, stacked obliquely one above the other, which extend over the panel surfaces. There is hence no danger of delamination between the ribs and the skins. Consequently, the panel which is thus obtained can comfortably meet the requirements with regard to bending and torsion and impact load. The core elements which are here used can possess different cross sectional forms, such as square, rectangular, but triangular cross sectional forms are also possible. In this last variant, including viewed in the transverse direction of the sandwich panel, the forces can be readily transmitted. Furthermore, the core elements can be of tubular construction, though solid core elements may also be used. The panel surfaces of the panel thus obtained are formed by the core elements, as well as by those portions of the various material strips which extend thereover. These material strips are stacked one upon the other; the number in the stack can be varied by adjusting the width, that is to say the dimension of material strips transversely to the longitudinal direction of the core elements. If now a large local load or point load is applied to such a sandwich panel, such as caused, for example, by the above-described falling-off freight, the surface of the sandwich panel can get damaged. This implies that locally the material strips are damaged and that possibly one or some of the core elements are likewise damaged.

The important advantage of the sandwich panel according to the invention is, however, that this damage has a very local character and does not display a tendency to spread over the rest of the construction. Even though one or some material strips and core elements are locally damaged, because the rest of the material strips and core elements, that is to say in the transverse direction beyond the damage, remains intact, those parts of the material strips which are found there are capable of maintaining the integrity of the panel in the direction of overstress.

The material strips can extend in a variety of ways relative to the core elements. According to a first option, the material strips can each comprise a portion located between two neighboring core elements, a portion extending over one neighboring element and along one panel surface, as well as a portion extending over the other neighboring core element and along the other panel surface. In such a case, the material strips possess essentially a Z-shape.

According to another option, the material strips can each extend over one and the same neighboring element and along both panel surfaces. In this case, the material strips possess essentially tilted U-shape.

As already stated, those portions of the material strips which are located along the panel surfaces extend over a plurality of core elements. Preferably, the material strips forming the panel surface describe an angle of inclination of 20 degrees or less relative to the transverse direction of the panel.

According to one possible variant, material strips can comprise a portion located between two neighboring core elements and extending only over a portion of these core elements, as well as a portion extending only along a panel surface.

According to yet another variant, core elements close to both panel surfaces can be provided with material strips, which comprise a portion located between two neighboring core elements and extending only over a portion of these core elements, as well as a portion extending only along a panel surface.

Furthermore, those portions of two material strips which extend between respectively two neighboring core elements are overlapped by a connecting strip located between these core elements. The invention further relates to a method for producing a panel, such as for a bridge deck, comprising the following steps:
- the provision of a core element,
- the covering of this core element with a strip of impregnable flexible material which continues transversely to the longitudinal direction of the core element to beyond this core element,
- the provision of a following core element alongside the preceding covered core element and on that portion of the strip of flexible material covering this preceding core element which is continued beyond the preceding core element,
- the covering of the following core element with a following strip of flexible material which continues transversely to the longitudinal direction of the following core element to beyond this following core element,
- the at least single repetition of the step of providing a following core element, the step of placing this following core element alongside a preceding covered core element and on that portion of the preceding strip of flexible material covering the preceding core element which is continued beyond the preceding core element, as well as the step of covering the following core element with a following strip of flexible material which continues transversely to the longitudinal direction of the following core element to beyond this following core element,
- the impregnation of the strips of material with a hardenable fluid,
- the hardening of the impregnated strips of material.

This method is characterized by the fitting of the following strip of flexible material over the top face of a following core element, as well as over the preceding strip of flexible material extending over the top face of a preceding core element.

In the method according to the invention, a panel is obtained which consists of a large number of core elements extending parallelly alongside one another, which are mutually connected by the strips of flexible material folded essentially into a Z-shape, which extend over, under and between the core elements.

The method according to the invention can be implemented in a variety of ways; preferably, however, a template is used herein. In this case, the method comprises the following steps:
- the positioning of a core element in a template,
- the fitting of a strip of impregnable flexible material over the top face and a side face of the core element, as well as over that bottom portion of the template which adjoins this side face,
- the positioning of a following core element in the template against the flexible material which covers said side face of said core element and on the flexible material which covers said bottom portion,
- the fitting of a following strip of flexible material over the top face and a side face of the following core element, as well as over that bottom portion of the template which adjoins this side face,
- the repetition of the positioning of a following core element and a following strip of flexible material until the desired number of core elements alongside one another is obtained,
- the impregnation of the strips of flexible material with a hardenable fluid,
- the hardening of the hardenable fluid, with formation of the panel.

The shape of the template is here pre-chosen such that the desired shape of the panel is obtained, for example with a slight curvature in the longitudinal direction, in the transverse direction, etc.

As stated above, the panel surfaces of the panel are formed by the core elements and by the strips of flexible material extending thereover. The total thickness of these surfaces of the panels can be enlarged by making the various strips of flexible material extend more or less far over one another. If, for example, each strip of flexible material extends over three or more core elements, a triple-layered or multilayered surface is also formed. As already stated, this is obtained by the step of:
- fitting the following strip of flexible material over the top face of a following core element, as well as over the preceding strip of flexible material extending over the top face of a preceding core element.

On the bottom side of the panel also, the thickness of the surface can thus be influenced by the step of:
- fitting the following strip of flexible material over the preceding strip of flexible material extending from a preceding core element under the bottom face and past the side face of the following core element.

In a known manner, the strength and stiffness characteristics of the panel are influenced by the nature of the strips of flexible material. In particular, the method according to the invention can here comprise the steps of using strips of flexible material which comprise a fabric, and of aligning the threads in the longitudinal direction of the core elements. In the same way, the method according to the invention can comprise the steps of using strips of flexible material which comprise a fabric, and of aligning the threads of the fabric in the transverse direction of the core elements.

A variant of the method for producing a panel comprises the following steps:
- the provision of a core element,
- the covering of this core element with a strip of impregnable flexible material which continues transversely to the longitudinal direction of the core element to beyond this core element,
- the provision of a following core element on the preceding covered core element and on the preceding strip of flexible material,
- the covering of the following core element with a following strip of flexible material which continues transversely to the longitudinal direction of this following core element to beyond this following core element, the at least single repetition of the step of providing a following core element, the step of placing this following core element on a preceding core element and a preceding strip of flexible material covering the preceding core element, as well as the step of covering the following core element with a following strip of flexible material which continues transversely to the longitudinal direction of the following core element to beyond this following core element, with formation of a stack of core elements and intervening parts of the strips of flexible material, the abutment of those parts of the strips of flexible material which extend to beyond the stack against this stack, the impregnation of the strips of material with a hardenable fluid, the hardening of the impregnated strips of material into an end product.

This method is characterized by the fitting of the following strip of flexible material over a following core element, as well as over the preceding strip of flexible material extending over a preceding core element.

In particular, this method can be implemented with the following steps:

the provision of a template, the internal shape of which conforms to the contour of the end product to be produced, the placement of the template over the stack and those parts of the strips of flexible material which extend relative to this stack, the hardening of the impregnated strips of material while the template is in position over the stack.

The invention will be explained in greater detail below with reference to the illustrative embodiments represented in the figures.

FIG. 3 shows a third embodiment.

FIGS. 4-6 show the steps in the manufacture of a second embodiment.

FIGS. 7-10 show further embodiments.

Figure 1:
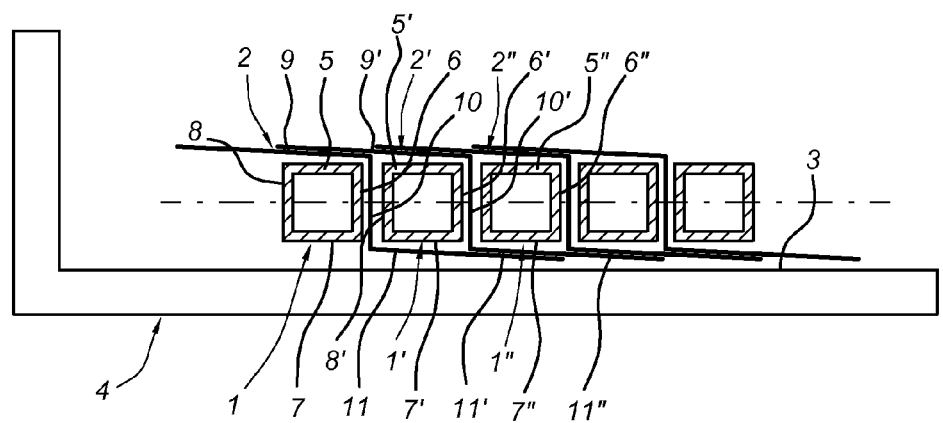
FIG. 1 shows the manufacture of a first embodiment.

FIG. 1 shows a portion of a template 4, having a form face 3. Onto this template is laid a first core element 1, which is tubular and consists of the top wall 5, the right-hand side wall 6, the bottom wall 7 and the left-hand side wall 8. The core element 1 is covered with a strip of impregnable flexible material 2. This strip of flexible material 2 has an uppermost portion 9 which is laid over the top wall 5, a centermost portion 10 which is laid against the right-hand side wall 6, and a lowermost portion 11 which is laid over the floor 3 of the template 4. The strip of flexible material 2 has thereby acquired a Z-shape.

The above-stated steps of putting a core element in place and laying of a strip of flexible material thereover are then repeated a number of times. Thus the following core element 1' is placed parallel to and alongside the preceding core element 1. The left-hand side wall 8' of the following core element 1' is here placed against that portion 10 of the strip of flexible material 2 which covers the right-hand side wall 6 of the core element 1. The bottom wall 7' of the following core element 1' is placed on that portion 11 of the strip of flexible material 2 which extends over the floor 3 of the template 4.

Over the following core element 1' there is then placed a following strip of flexible material 2'. The portion 9' thereof comes to lie upon the top wall 5' of the following core element 1'. It is also the case that this portion 9' of the following strip of flexible material 2' can possess such a dimension in the transverse direction to the core elements that this also covers that portion 9 of the strip of flexible material 2 which covers the core element 1. Depending on the particular dimension, this portion 9' can therefore extend over a plurality of preceding core elements and strips of flexible material.

The portion 10' of the following strip of flexible material 2' is laid over the right-hand side wall 6' of the following core element 1' and, finally, the portion 11' of the following strip of flexible material 2' is laid over the floor 3 of the template 4. This portion 11' of the following strip of flexible material 2' can here also cover a bit of the portion 11 of the previous strip of flexible material 2, which portion 11 had already been fitted on the floor 3 of the template 4. Depending on the dimension in the transverse direction relative to the core elements of this portion 11 of the strip of flexible material 2, the portion 11 can extend under a plurality of following core elements 1", etc.

In this way, a plurality of core elements 1', 1", etc. placed side by side are respectively covered by respective strips of flexible material 2', 2", etc.

Figure 2:
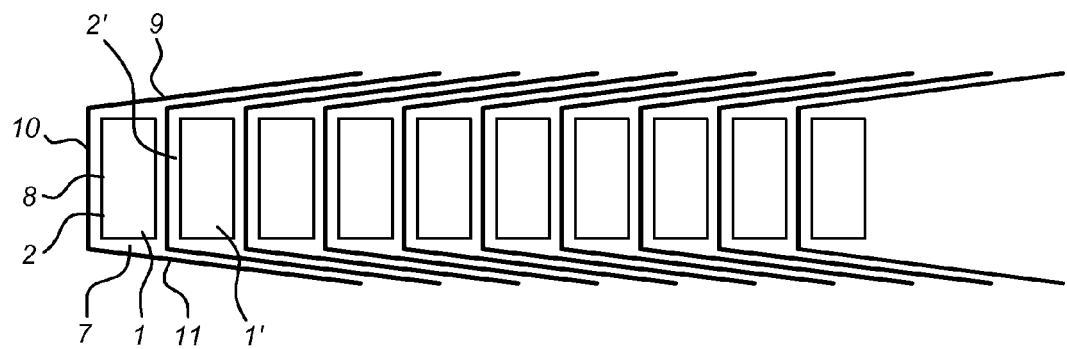
FIG. 2 shows a second embodiment.

FIG. 2 shows an alternative embodiment, wherein the uppermost portion 9 of the strip of flexible material is laid over the core element 1, the centermost portion 10 extends over the left-hand side wall 8, and the lowermost portion 11 extends under the bottom wall 7 of this same core element 1. The strips of flexible material in these are thus shaped according to a tilted U.

FIG. 3 shows that the core elements 1 can also possess a triangular shape.

Figure 6:
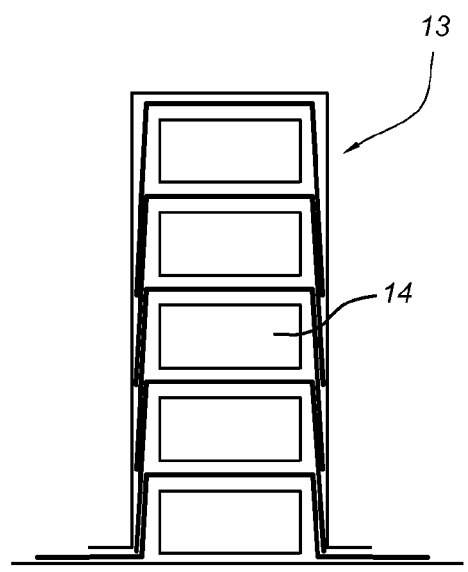

FIGS. 4-6 show a possible way of producing the embodiment of FIG. 2. Here, a first core element 1 is first put in place, over the top face 5 of which a strip of flexible material 1 is laid. On this a following core element 1' is placed, with thereover a following strip of flexible material 2'. These actions are repeated until a stack 12 of the desired height is obtained. This stack is formed by all the core elements 1, 1', 1", . . . and the intervening parts 10, 10', 10" . . . of the strips of flexible material 2, 2', 2", . . . . The parts 9, 9', 9", . . . and 11, 11', 11", . . . still extend freely beyond the stack 12.

Over this stack is then placed the template 13, the internal contour of which conforms to the shape of the end product which is ultimately to be formed. When the template is pushed onto the stack 12, those parts 9, 9', 9", . . . and 11, 11', 11", . . . of the strips of flexible material 2, 2', 2", . . . which are located beyond the stack 12 are shaped and pressed against the stack 12. Next, the strips of flexible material are impregnated; following hardening of these strips, the end product 14 is obtained.

Figure 7:
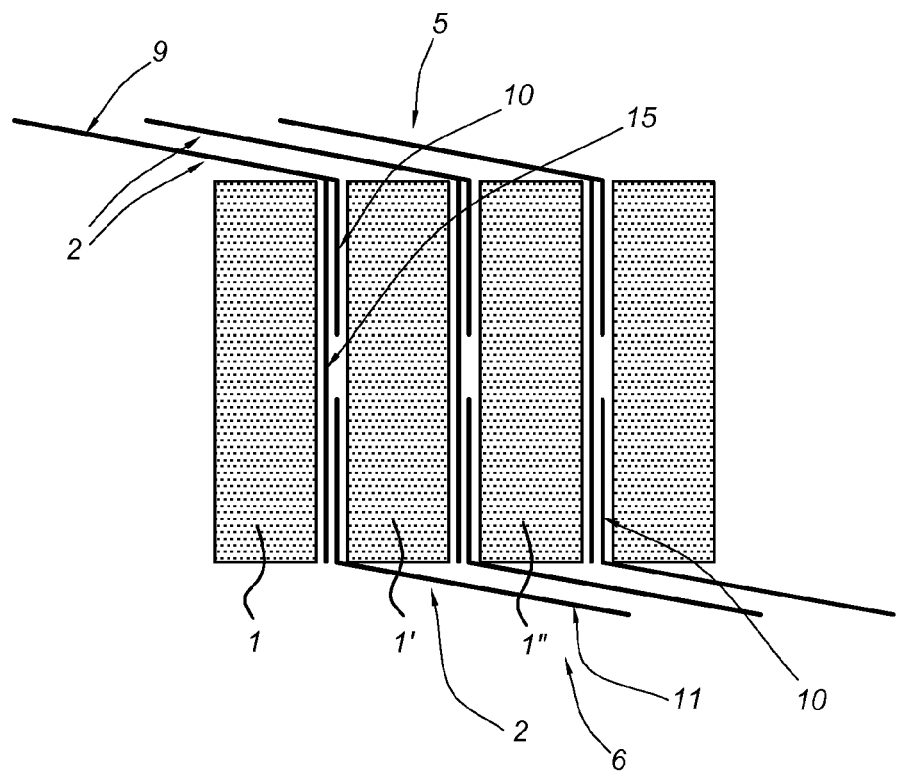

In the variant of FIG. 7, material strips 2 are used possessing a single portion 9, 11 which covers a top wall 5 and bottom wall 6 of the core elements 1, as well as a centermost portion 10 which is located between the core elements 1 and extends only over a portion of these core elements. These centermost portions 10 are connected to each other by the connecting strips 15.

Figure 8:
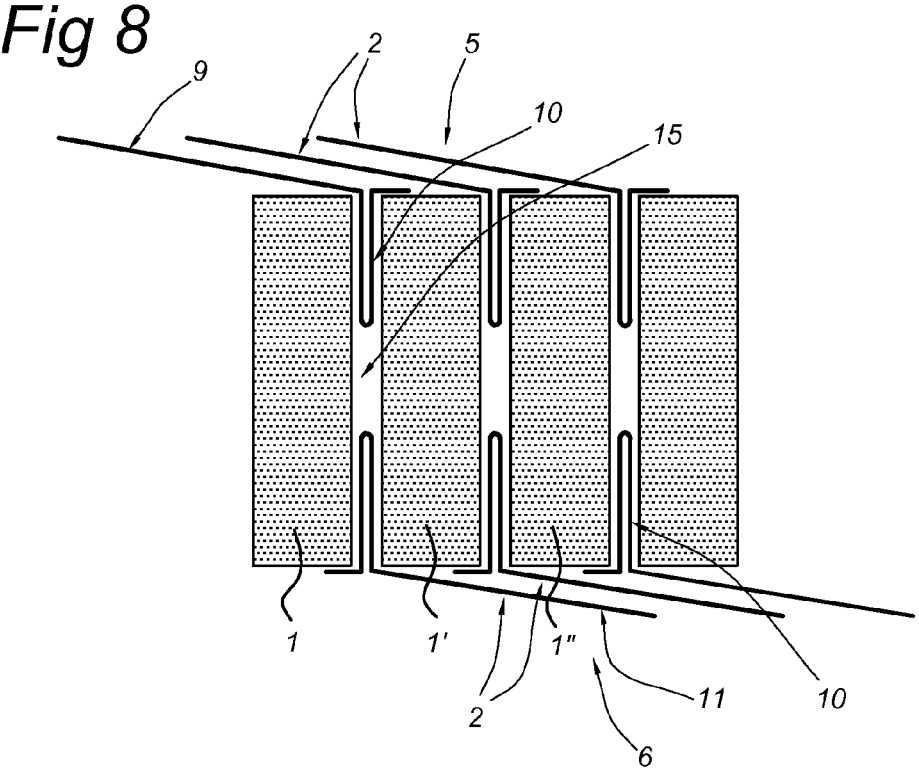

The variant of FIG. 8 is broadly consistent with that of FIG. 7, though the centermost portion 10 is now folded in two and folded back. The connecting strips can in this case be present.

Figure 9:
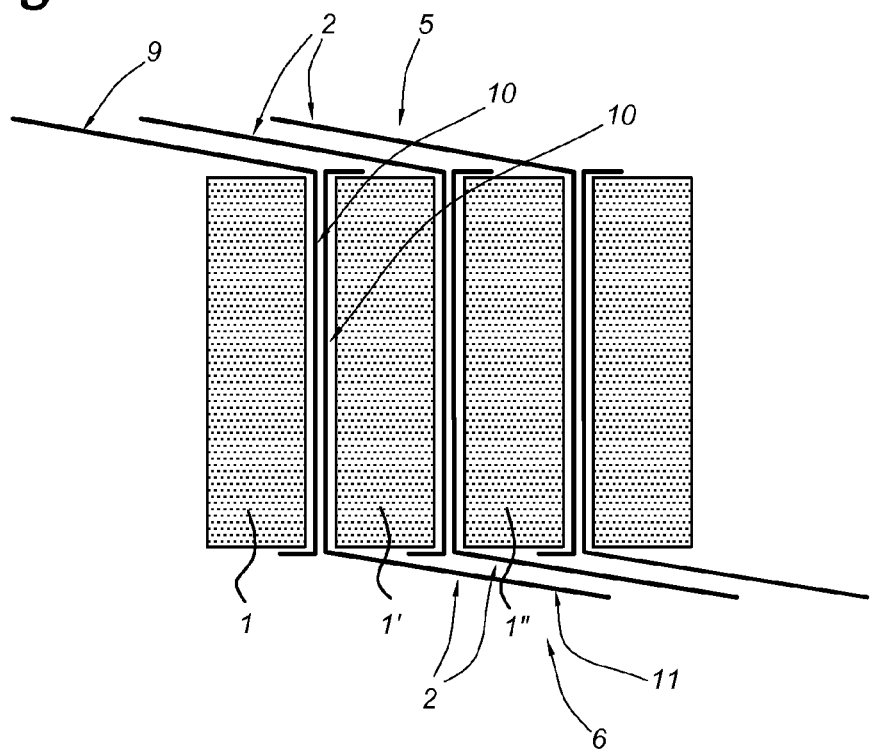

In the variant of FIG. 9, material strips 2 are used having a single portion 9, 11, which is located along a top wall 5 and bottom wall 6 respectively of the core elements and extends over a plurality of core elements. The middle portion 10 extends over the entire height between the core elements, while, on the rim thereof opposite the rim where the single portion 19 is, a small bent-over portion is present, which extends only over a part of a core element.

In the variant of FIG. 10, the middle portions 10 extend over virtually the entire height between the core elements 1, while the material strips 2 possess only a single portion 9 and 11 respectively, which extends over the top face 5 and bottom face 6 respectively.

LIST OF REFERENCE SYMBOLS 1, 1', 1" . . . core element
2, 2', 2" . . . flexible strip-shaped material
3 floor of template
4 template
5 top wall of core element
6 right-hand side wall of core element
7 top wall of core element
8 left-hand side wall of core element
9, 9', 9" . . . uppermost portion of flexible strip-shaped material
10, 10', 10" . . . centermost portion of flexible strip-shaped material
11, 11', 11" . . . lowermost portion of flexible strip-shaped material
12 stack
13 template
14 end product
15 connecting strip

The invention claimed is:

1. A method for producing a panel having first and second panel surfaces that are mutually averted, the method comprising:
    providing a core element;
    arranging a strip of impregnable flexible material along the core element, such that the strip defines a first lateral portion over a top face of the core element, a medial portion along a side face of the core element, and a second lateral portion extending beyond the core element transversely to a longitudinal direction thereof;
    repeating at least twice each of:
        providing a following core element alongside a preceding core element and on a preceding second lateral portion of a preceding strip of impregnable flexible material, and
        arranging a following strip of impregnable flexible material along the following core element, such that the following strip defines a following first lateral portion over a top face of the following core element as well as over a preceding first lateral portion of the preceding strip, a following medial portion along a side face of the following core element, and a following second lateral portion extending beyond the following core element transversely to a longitudinal direction thereof;
    thereby forming a series of parallel core elements and strips of impregnable flexible material that include medial portions located between two respective neighboring core elements, first lateral portions extending one above the other over multiple core elements and along the first panel surface, and second lateral portions extending one above the other over multiple core elements and along the second panel surface;
    impregnating the strips of impregnable flexible material with a hardenable fluid; and
    hardening the impregnated strips of material, to form the panel.

2. The method for producing a panel as claimed in claim 1, comprising:
    positioning the core element in a template that defines a form surface,
    fitting the strip of impregnable flexible material over the top face and the side face of the core element, as well as over a portion of the form surface of the template which adjoins the side face,
    positioning the following core element in the template against the flexible material which covers said side face of said core element and on the flexible material which covers said form surface,
    fitting the following strip of flexible material over the top face and the side face of the following core element, as well as over a following portion of the form surface of the template which adjoins the side face,
    repeating the positioning of all following core elements and all following strips of flexible material until the desired number of core elements alongside one another is obtained,
and
    hardening the hardenable fluid, with formation of a plate girder.

3. The method as claimed in claim 1, comprising:
    fitting the following strip of flexible material over the preceding strip of flexible material extending from the preceding core element under a bottom face and past the side face of the following core element.

4. The method as claimed in claim 1, comprising using tubular core elements.

5. The method as claimed in claim 1, comprising impregnating the flexible material under vacuum.

6. The method as claimed in claim 1, comprising:
    impregnating the strip of impregnable flexible material directly after arranging the strip along the core element, and
    impregnating the following strip of impregnable flexible material directly after arranging the following strip along the following core element.

7. A method for producing a panel having first and second panel surfaces that are mutually averted, the method comprising:
    providing a core element;
    covering the core element with a strip of impregnable flexible material, such that the strip defines a medial portion covering the core element, and lateral portions which continue transversely to a longitudinal direction of the core element to beyond the core element;
    repeating at least twice each of:
        providing a following core element on a preceding core element and on a preceding medial portion of a preceding strip of flexible material, and
        covering the following core element with a following strip of flexible material, such that the following strip defines a following medial portion covering the following core element, and following lateral portions which continue transversely to the longitudinal direction of the following core element to beyond the following core element;
    thereby forming a stack of parallel core elements and strips of impregnable flexible material that include medial portions located between two respective neighboring core elements;
    abutting first lateral portions of the strips against the stack and along the first panel surface, and abutting second lateral portions of the strips against the stack and along the second panel surface, such that the first lateral portions extend one above the other over multiple core elements and along the first panel surface, and the second lateral portions extend one above the other over multiple core elements and along the second panel surface;

impregnating the strips of material with a hardenable fluid; and hardening the impregnated strips of material to form the panel.

8. The method as claimed in claim 7, further comprising:
providing a template with an internal shape that conforms to an outer contour of the panel;
placing the template over the stack and over the first and second lateral portions of the strips of flexible material; and
hardening the impregnated strips of material while the template is in position over the stack.

9. The method as claimed in claim 2, comprising:
fitting the following strip of flexible material over the preceding strip of flexible material extending from the preceding core element under a bottom face and past the side face of the following core element.

10. The method as claimed in claim 2, comprising using tubular core elements.

11. The method as claimed in claim 2, comprising impregnating the flexible material under vacuum.

12. The method as claimed in claim 2, comprising:
impregnating the strip of impregnable flexible material directly after arranging the strip along the core element, and
impregnating the following strip of impregnable flexible material directly after arranging the following strip along the following core element.

13. The method according to claim 1, whereby forming the series of parallel core elements and strips comprises:
letting the first lateral portions extend obliquely one above the other along the first panel surface and relative to a transverse direction of the panel, and letting the second lateral portions extend obliquely one above the other along the second panel surface and relative to the transverse direction of the panel.

14. The method according to claim 1, whereby forming the series of parallel core elements and strips comprises:
letting each of the first lateral portions of the strips extend over at least three core elements, thereby forming a first panel surface that is at least triple-layered.

15. The method according to claim 14, whereby forming the series of parallel core elements and strips further comprises:
letting each of the second lateral portions of the strips extend over at least three core elements, thereby forming a second panel surface that is at least triple-layered.

16. The method according to claim 7, wherein abutting the first and second lateral portions comprises:
letting the first lateral portions extend obliquely one above the other along the first panel surface, and letting the second lateral portions extend obliquely one above the other along the second panel surface.

17. The method according to claim 7, wherein abutting the first lateral portions comprises:
letting each of the first lateral portions of the strips extend over at least three core elements, thereby forming the first panel surface that is at least triple-layered.

18. The method according to claim 17, wherein abutting the second lateral portions comprises:
letting each of the second lateral portions of the strips extend over at least three core elements, thereby forming the second panel surface that is at least triple-layered.

* * * * *